US011274739B2

(12) United States Patent
Shimamura et al.

(10) Patent No.: US 11,274,739 B2
(45) Date of Patent: Mar. 15, 2022

(54) PULLEY STRUCTURE AND METHOD FOR MANUFACTURING PULLEY STRUCTURE

(71) Applicant: Mitsuboshi Belting Ltd., Kobe (JP)

(72) Inventors: Hayato Shimamura, Hyogo (JP); Katsuya Imai, Hyogo (JP); Ryosuke Dan, Hyogo (JP); Takashi Morimoto, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 231 days.

(21) Appl. No.: 16/499,512

(22) PCT Filed: Mar. 28, 2018

(86) PCT No.: PCT/JP2018/013063
§ 371 (c)(1),
(2) Date: Sep. 30, 2019

(87) PCT Pub. No.: WO2018/181627
PCT Pub. Date: Oct. 4, 2018

(65) Prior Publication Data
US 2020/0025283 A1    Jan. 23, 2020

(30) Foreign Application Priority Data

Mar. 30, 2017 (JP) .............................. JP2017-066808
Feb. 28, 2018 (JP) .............................. JP2018-034232

(51) Int. Cl.
*F16H 57/04* (2010.01)
*F02B 63/04* (2006.01)
(Continued)

(52) U.S. Cl.
CPC ......... *F16H 57/041* (2013.01); *F02B 63/042* (2013.01); *F02B 67/06* (2013.01);
(Continued)

(58) Field of Classification Search
CPC .... F16H 55/36; F16H 2055/366; F16H 45/02; F16D 41/206
(Continued)

(56) References Cited

U.S. PATENT DOCUMENTS 5,226,856 A * 7/1993 Iacchetta ................. F16G 13/06
474/207
7,618,337 B2 * 11/2009 Jansen ..................... F16D 3/72
474/74
(Continued)

FOREIGN PATENT DOCUMENTS

CN        102399614 A     4/2012
CN        102985520 A     3/2013
(Continued)

OTHER PUBLICATIONS

Apr. 21, 2020—(U.S.) Notification of Reasons of Refusal—App 2018-034232.
(Continued)

*Primary Examiner* — Henry Y Liu
(74) *Attorney, Agent, or Firm* — Banner & Witcoff, Ltd.

(57) ABSTRACT

A pulley structure may include: a tubular outer rotating body having a belt looped thereon; an inner rotating body which is disposed radially inside the outer rotating body and which is rotatable relative to the outer rotating body; and a torsional coil spring which is arranged in a spring accommodating space formed between the outer rotating body and the inner rotating body. At least in a state in which the pulley structure has not been operated even once, grease containing a rust inhibitor is applied to an opposing surface of the inner rotating body opposing an inner peripheral surface of the torsional coil spring.

7 Claims, 8 Drawing Sheets

(51) Int. Cl.
*F02B 67/06* (2006.01)
*F16C 17/02* (2006.01)
*F16C 33/20* (2006.01)
*F16F 15/121* (2006.01)
*F16H 55/36* (2006.01)

(52) U.S. Cl.
CPC .............. *F16C 17/02* (2013.01); *F16C 33/20* (2013.01); *F16F 15/1216* (2013.01); *F16H 55/36* (2013.01); *F16H 57/0464* (2013.01); *F16H 2055/366* (2013.01)

(58) Field of Classification Search
USPC ....................................................... 474/70, 94
See application file for complete search history.

(56) References Cited

U.S. PATENT DOCUMENTS

| | | | | |
|---|---|---|---|---|
| 7,975,821 | B2* | 7/2011 | Antchak | F16D 41/206 192/55.1 |
| 8,789,670 | B2* | 7/2014 | Antchak | F16D 41/20 192/41 S |
| 8,985,293 | B2* | 3/2015 | Marion | F16D 13/76 192/55.5 |
| 9,732,222 | B2* | 8/2017 | Touraud | C08G 69/42 |
| 10,415,649 | B2* | 9/2019 | Williams | F16D 41/206 |
| 10,415,685 | B2* | 9/2019 | Imai | F16D 3/00 |
| 2003/0199348 | A1 | 10/2003 | Huber | |
| 2004/0014540 | A1* | 1/2004 | Dell | F16H 55/36 474/70 |
| 2008/0194339 | A1* | 8/2008 | Antchak | F16D 41/206 464/40 |
| 2009/0176583 | A1* | 7/2009 | Dell | F02N 15/08 464/40 |
| 2011/0065537 | A1* | 3/2011 | Serkh | F16H 55/36 474/94 |
| 2011/0224038 | A1* | 9/2011 | Aantchak | F16D 41/206 474/94 |
| 2011/0245000 | A1* | 10/2011 | Serkh | F16F 15/1217 474/94 |
| 2012/0088616 | A1* | 4/2012 | Ali | F16F 15/123 474/94 |
| 2013/0130957 | A1* | 5/2013 | Matsubara | C10M 135/10 508/411 |
| 2013/0217524 | A1* | 8/2013 | Antchak | F16D 3/14 474/94 |
| 2013/0324335 | A1* | 12/2013 | Chen | F16D 13/76 474/94 |
| 2013/0345004 | A1* | 12/2013 | McCrary | F16D 3/12 474/148 |
| 2014/0106914 | A1* | 4/2014 | Proost | F16C 33/201 474/111 |
| 2014/0179187 | A1* | 6/2014 | Restuccia | D04H 5/04 442/149 |
| 2015/0184698 | A1* | 7/2015 | Govert | B21H 5/025 464/112 |
| 2015/0184703 | A1* | 7/2015 | Shimamura | F16H 55/36 192/41 S |
| 2015/0276039 | A1* | 10/2015 | Williams | F16D 41/206 474/94 |
| 2015/0285365 | A1* | 10/2015 | Canto Michelotti | F16D 3/72 474/94 |
| 2015/0316138 | A1* | 11/2015 | Dell | F16D 13/76 474/91 |
| 2016/0138699 | A1* | 5/2016 | Dell | F16F 15/12346 474/94 |
| 2016/0146328 | A1* | 5/2016 | Dell | B60K 25/02 474/94 |
| 2016/0195162 | A1* | 7/2016 | Manzoor | F16F 15/12 474/94 |
| 2017/0037217 | A1 | 2/2017 | Taketani et al. | |
| 2017/0045091 | A1* | 2/2017 | Williams | F02B 67/06 |
| 2017/0122425 | A1* | 5/2017 | Schneider | F16D 13/76 |
| 2017/0267861 | A1* | 9/2017 | I | C08J 3/20 |
| 2018/0045287 | A1* | 2/2018 | Imai | F16C 33/726 |
| 2018/0106355 | A1* | 4/2018 | Canto Michelotti | F16D 3/12 |
| 2018/0282496 | A1* | 10/2018 | Nakano | C08G 69/46 |

FOREIGN PATENT DOCUMENTS

| | | |
|---|---|---|
| CN | 104105897 A | 10/2014 |
| CN | 104428563 A | 3/2015 |
| CN | 106029783 A | 10/2016 |
| EP | 2865925 A1 | 4/2015 |
| JP | H05-026255 A | 3/1993 |
| JP | H06-184438 A | 7/1994 |
| JP | 2002-349611 A | 12/2002 |
| JP | 2007-231968 A | 9/2007 |
| JP | 2008082508 A | 4/2008 |
| JP | 2015-518946 A | 7/2015 |
| JP | 2015-522772 A | 8/2015 |
| JP | 2016-156500 A | 9/2016 |
| WO | 2004/011818 A1 | 2/2004 |
| WO | 2015-162659 A1 | 10/2015 |
| WO | 2016/133148 A1 | 8/2016 |

OTHER PUBLICATIONS

Jun. 12, 2018—International Search Report—Intl App PCT/JP2018/013063.
Jun. 21, 2021—(ID) Substantive Examination Report Notification—App P00201908540.
Oct. 26, 2020—(CA) Office Action—App 3,052,406.
Dec. 21, 2020—(EP) Extended Search Report—App 18777732.1.
Dec. 15, 2020—(IN) Office Action—App 201917037017.
Oct. 10, 2021—(EP) Examination Report—App 18777732.1.
Jan. 19, 2022—(CN) Notification of First Office Action—App 201880012811.X—Eng Tran.

* cited by examiner

[FIG. 1]
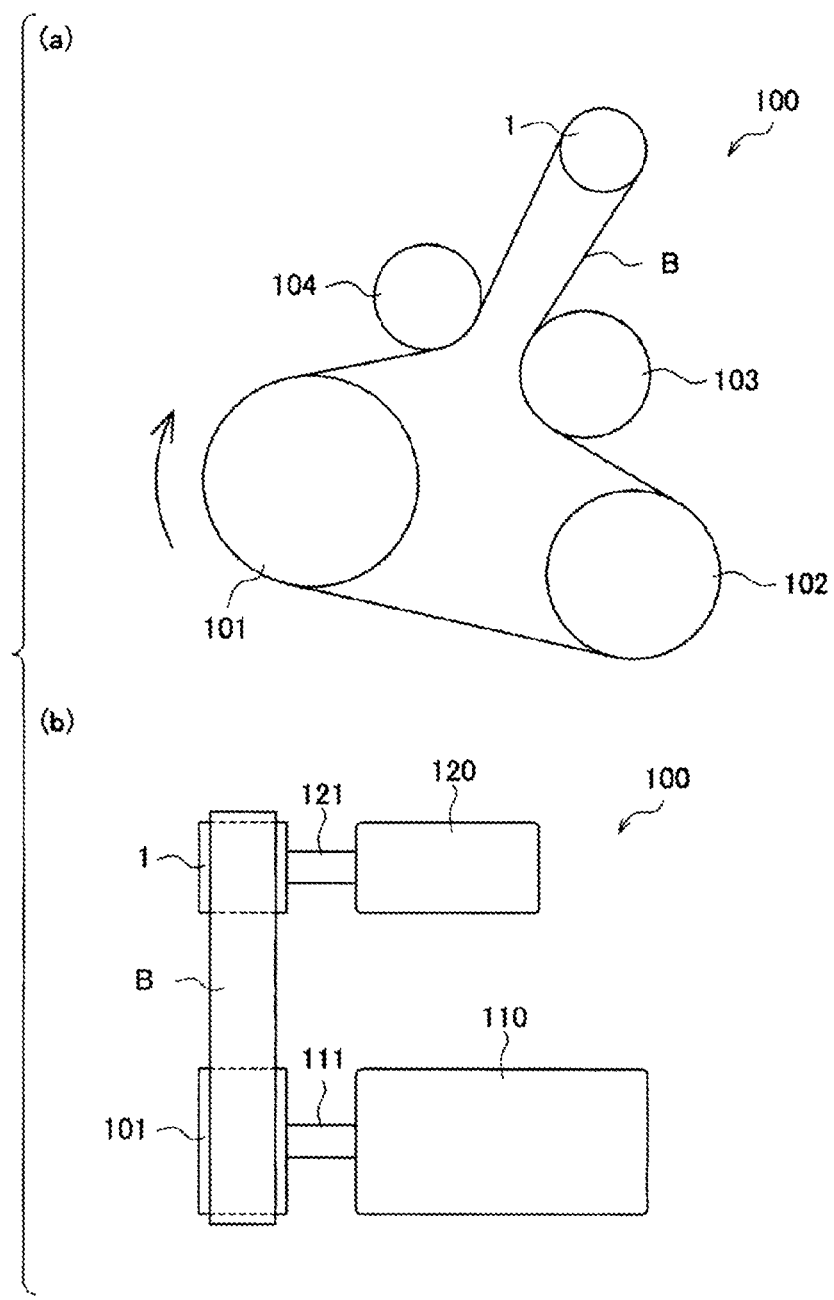

[FIG. 2]
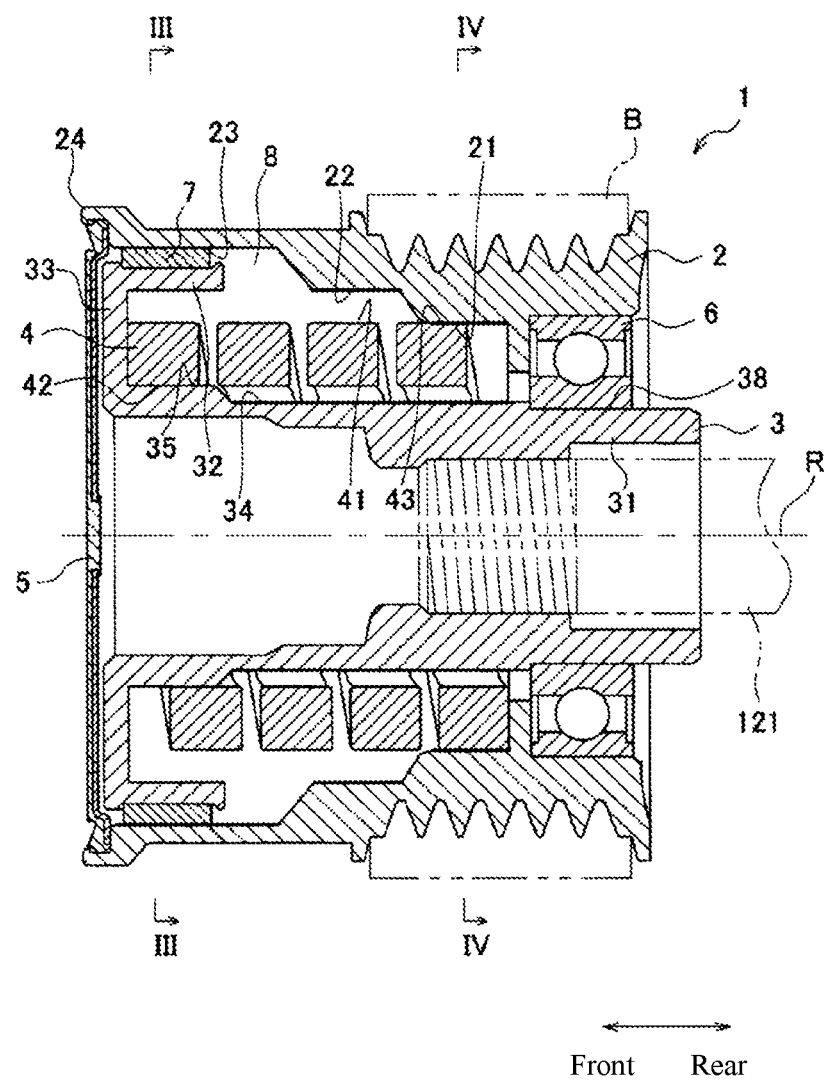

[FIG. 3]
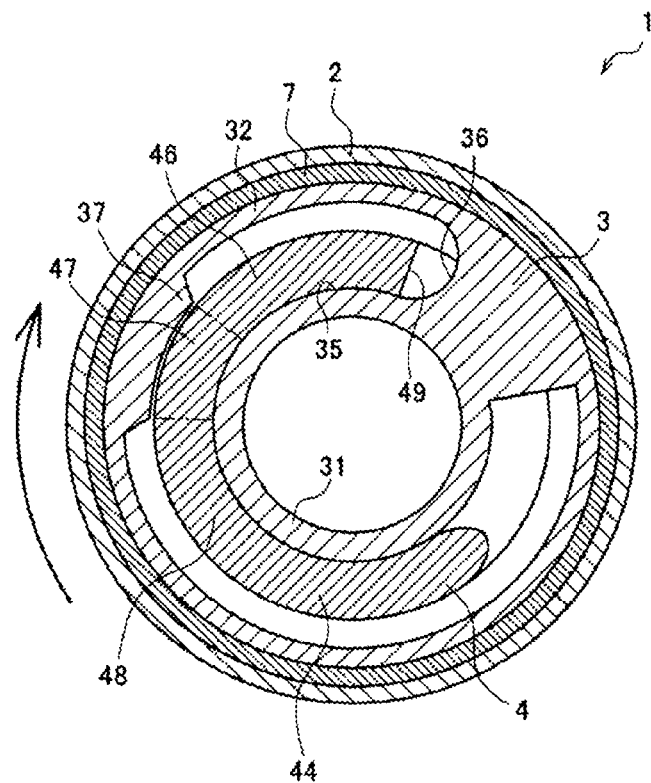
[FIG. 4]
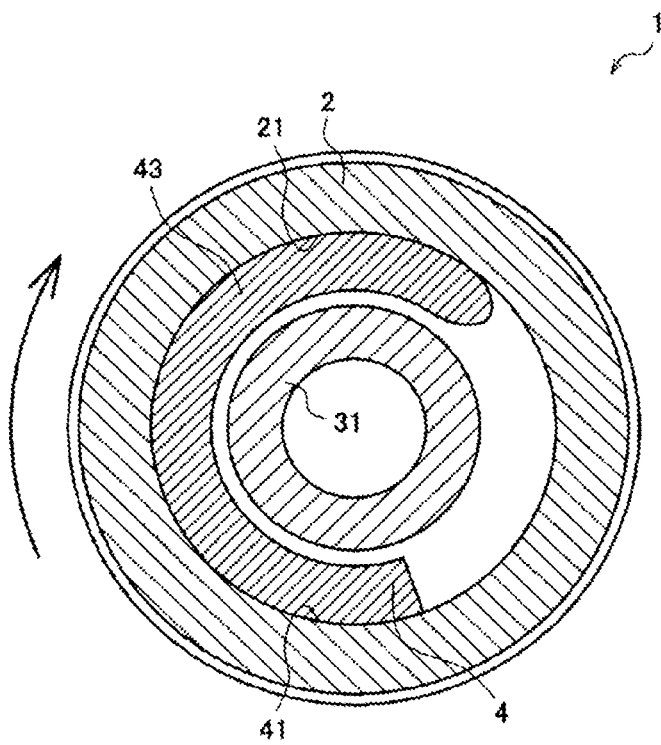

[FIG. 5]
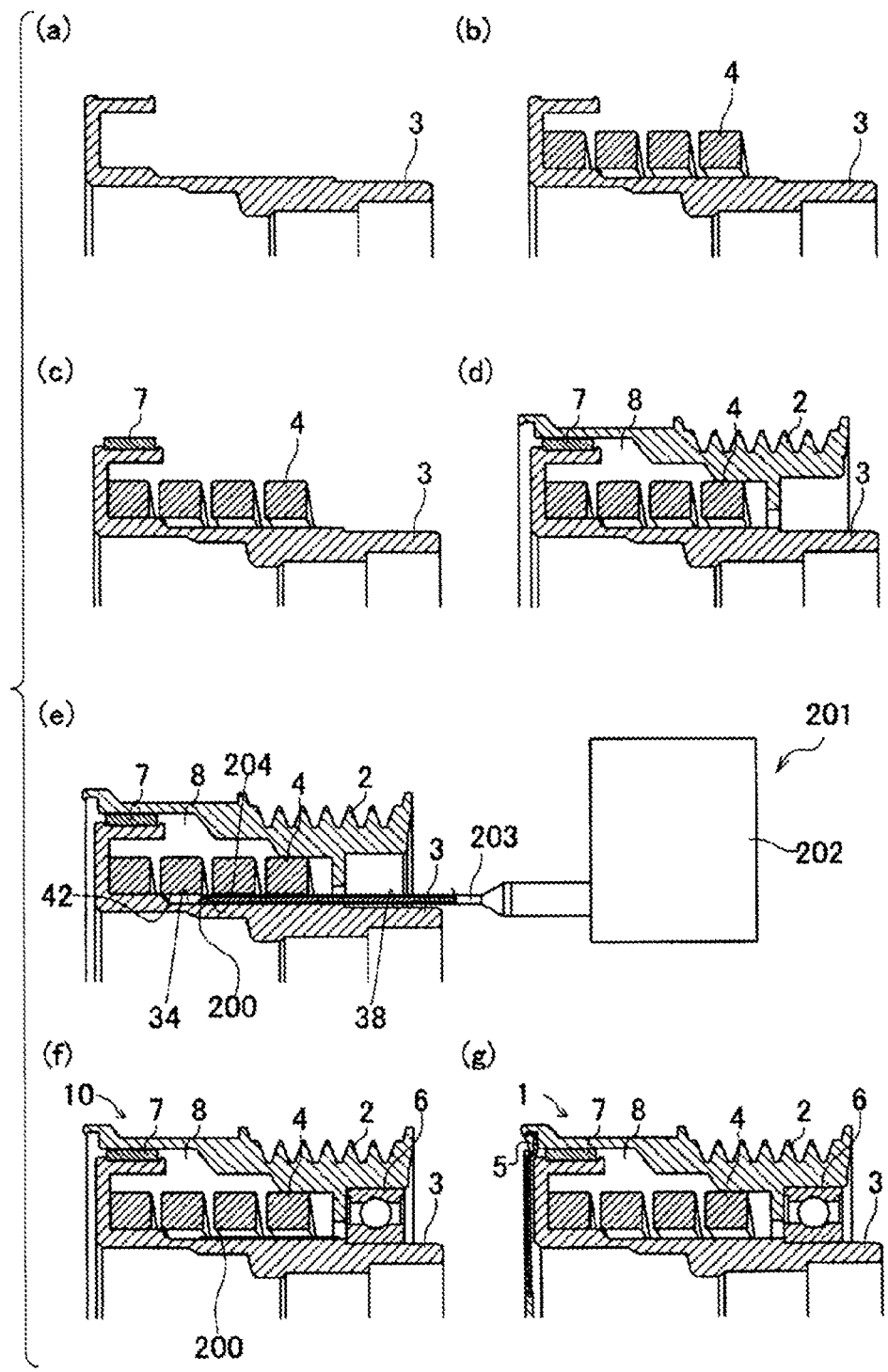

[FIG. 6]
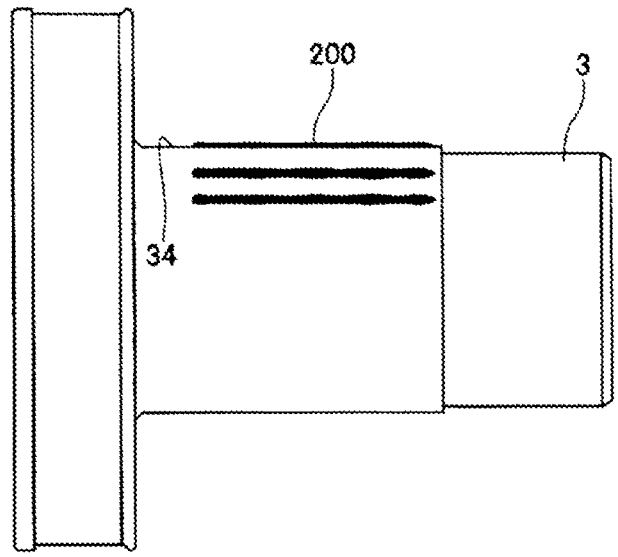
[FIG. 7]
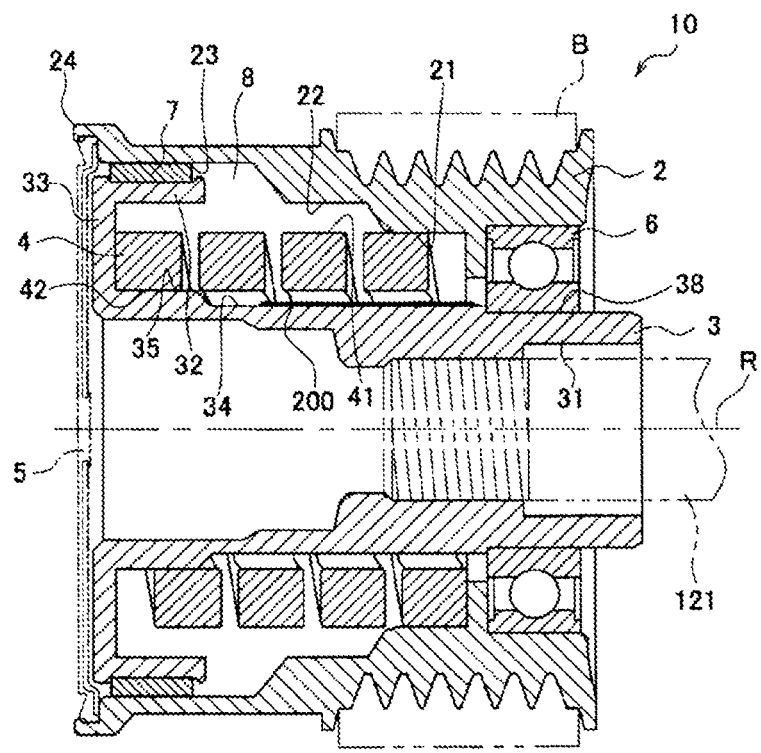
Front  Rear

[FIG. 8]
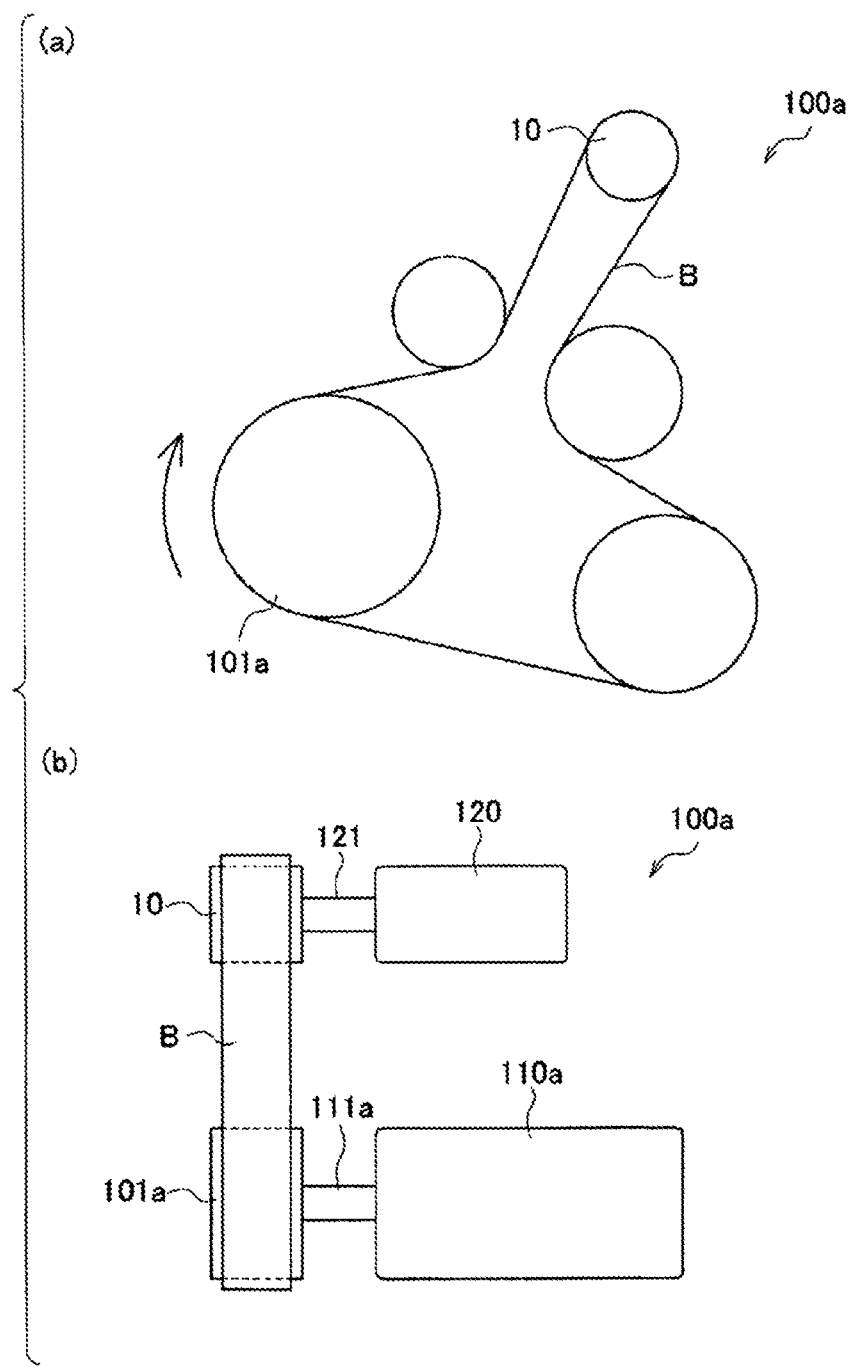

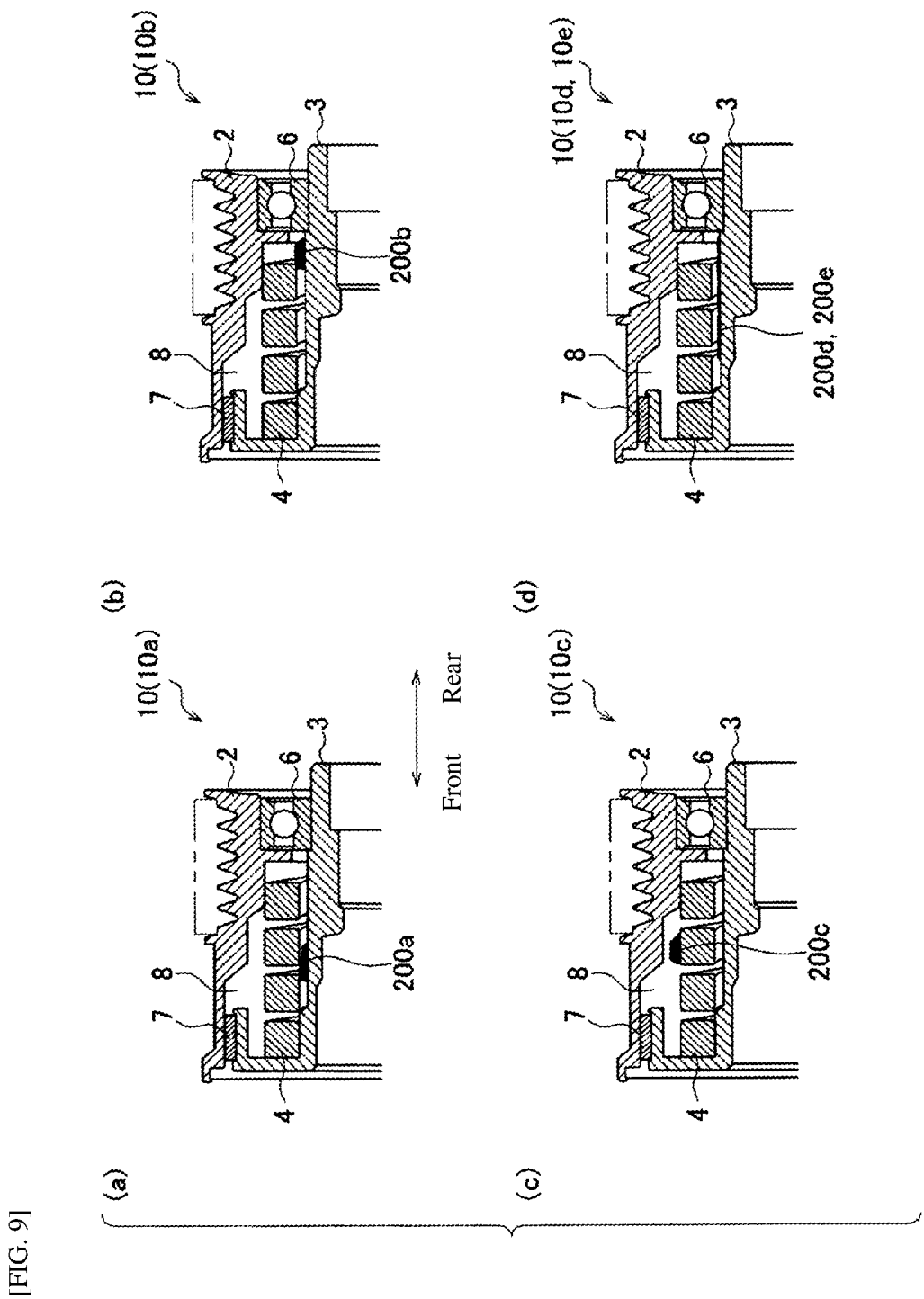
[FIG. 9]

[FIG. 10]
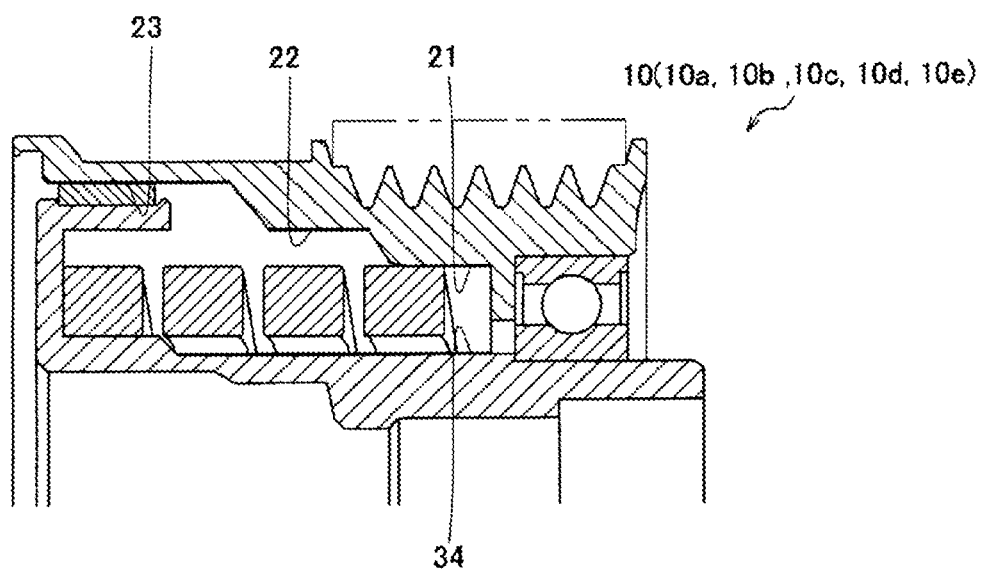

PULLEY STRUCTURE AND METHOD FOR MANUFACTURING PULLEY STRUCTURE

CROSS REFERENCE TO RELATED APPLICATIONS

This is a U.S. National Phase Application under 35 U.S.C. § 371 of International Application No. PCT/JP2018/013063, filed Mar. 28, 2018, which claims priority to Japanese Application Nos. 2017-066808, filed Mar. 30, 2017 and 2018-034232, filed Feb. 28, 2018, which was published Under PCT Article 21(2), the entire contents of which are incorporated herein by reference.

TECHNICAL FIELD

The present invention relates to a pulley structure having a spring accommodation space formed between two rotating bodies, and a method for manufacturing the pulley structure.

BACKGROUND ART

To an accessory machine having a large moment of inertia, such as an alternator driven by power of an engine of an automobile and the like, is connected to, for example, a pulley structure described in PTL 1 for the purpose of absorbing fluctuations in the rotational speed of the crankshaft of the engine.

The pulley structure described in PTL 1 includes: an outer rotating body around which a belt is to be wound; an inner rotating body provided radially inward on the outer rotating body and relatively rotatable with respect to the outer rotating body; a torsion coil spring disposed in spring accommodation space formed between the two rotating bodies; and the like. The pulley structure has a clutch mechanism that transmits or blocks torque between the outer rotating body and the inner rotating body via the torsion coil spring.

Since the two rotating bodies are made of metal, when rust is generated and interposed between the torsion coil spring and the rotating bodies, the function of the clutch mechanism and the like may be reduced and the life may be shortened. Therefore, a coating for rust prevention is applied to several portions. On the other hand, for example, in a portion in contact with the torsion coil spring in the spring accommodation space and the like, the coating may be peeled off, so that a grease containing a rust inhibitor is used instead of the coating. More specifically, when assembling the pulley structure, the grease is put into the spring accommodation space in a pasty lump state. Since the grease has high viscosity at normal temperature and is less likely to flow, the temperature in the spring accommodation space is raised by running the pulley structure in, for example, an operation test of the alternator, and the temperature of the grease is raised to lower the viscosity. When the pulley structure is made to rotate in this state, the rust inhibitor is diffused to a portion of the two rotating bodies facing the spring accommodation space by centrifugal force and the like. In this way, compared to the case where the rust inhibitor is adhered to the entire region facing the spring accommodation space one by one, the labor is significantly reduced, and the use amount of rust inhibitor can be minimized.

CITATION LIST

Patent Literature

PTL 1: JP-A-2016-156500

SUMMARY OF INVENTION

Technical Problem

When the grease is simply put into the spring accommodation space in a lump state, the grease may be in a state of coming into contact with only an unspecified portion of the spring accommodation space. In this case, heat is less likely to be transferred to the grease due to reasons such as a small heat-transfer area and thus, the viscosity is less likely to decrease. Therefore, when the pulley structure is rotated, it may be difficult to diffuse the grease to every corner of the region facing the spring accommodation space of the two rotating bodies.

An object of the present invention is to facilitate diffusion of the rust inhibitor over the entire region facing the spring accommodation space.

Solution to Problem

The pulley structure in a first aspect of the present invention is a pulley structure to be connected to an accessory machine of an engine and to which power of the engine is to be transmitted via a belt, the pulley structure including: a cylindrical outer rotating body around which the belt is to be wound; an inner rotating body provided radially inward on the outer rotating body and relatively rotatable with respect to the outer rotating body; and a torsion coil spring disposed in a spring accommodation space formed between the outer rotating body and the inner rotating body, in which at least in a state where the pulley structure is not yet operated once, a grease containing a rust inhibitor is applied to a facing surface of the inner rotating body, facing an inner circumferential surface of the torsion coil spring.

According to the pulley structure of the present invention, in a state where the pulley structure is not yet operated once, the grease containing a rust inhibitor is in a state of being applied to the facing surface of the inner rotating body, facing the inner circumferential surface of the torsion coil spring. As a result, since the contact area with the inner rotating body is larger as compared to the case where the grease is simply put in the spring accommodation space in a lump state, heat of the inner rotating body is likely to be transferred to the grease during the operation test of the accessory machine and the like, the temperature of the grease is likely to be raised, and the viscosity is likely to decrease. In addition, since the grease is applied to the facing surface disposed radially inward among surfaces forming the spring accommodation space, the grease is likely to spread over the inner rotating body, and the centrifugal force due to the rotation of the inner rotating body acts on the grease, and thus the grease is also likely to be diffused radially outward. Therefore, the rust inhibitor can be made to be easily diffused in the entire region facing the spring accommodation space.

In the pulley structure according to a second aspect of the present invention, in the first aspect, the grease has a thickness of 2 mm or less on the facing surface.

In order to facilitate the transfer of the heat of the inner rotating body to the entire grease, the thickness of the grease on the facing surface is preferably 2 mm or less.

In the pulley structure according to a third aspect of the present invention, in the first or second aspect, the grease has an adhering area to the facing surface being 4% or more of the area of the facing surface.

In this aspect, the adhering area of the grease to the facing surface is 4% or more of the area of the facing surface. That is, since the heat-transfer area of the grease is large, heat of the inner rotating body is easily transferred to the grease.

In the pulley structure according to a fourth aspect of the present invention, in any one of the first to third aspects, the grease is applied on the facing surface along a rotation axis direction of the inner rotating body.

In the radial direction, since the centrifugal force due to the rotation of the inner rotating body acts on the grease during the operation test of the accessory machine and the like, the grease is likely to be diffused to outside. However, in the rotation axis direction, since no particularly large force acts on the grease, the grease is relatively less likely to be diffused. In this aspect, since the grease is applied on the facing surface along the rotation axis direction of the inner rotating body, the grease can be easily diffused in the rotation axis direction.

In the pulley structure according to a fifth aspect of the present invention, in any one of the first to fourth aspects, the grease is applied only to the facing surface of the inner rotating body among surfaces forming the spring accommodation space.

In this aspect, the grease is applied only to the facing surface of the inner rotating body among the surfaces forming the spring accommodation space. Therefore, it is possible to efficiently diffuse the grease in the spring accommodation space by the rotation of the inner rotating body while reducing the labor as compared to the case where the grease is also applied to other places.

The pulley structure according to a sixth aspect of the present invention, in any one of the first to fifth aspects, includes a sliding bearing interposed between the inner rotating body and an end portion of the outer rotating body in a rotation axis direction.

When the outer rotating body corrodes and rust is generated in the gap between the outer rotating body and the sliding bearing, the bearing function may significantly deteriorate. Therefore it is necessary to diffuse the rust inhibitor on the surface of the outer rotating body, facing to the sliding bearing. However, in the case where the grease is applied only to the outer rotating body, even when the pulley structure is operated to rotate, a force radially inward does not act on the grease, and the grease is less likely to be diffused into the inner rotating body. On the other hand, in the case where the grease is applied to both the inner rotating body and the outer rotating body, labor is required and production efficiency is reduced. In this aspect, since the grease is applied to the facing surface of the inner rotating body, the grease is likely to be diffused into both the inner rotating body and the outer rotating body. Therefore, even in the case where the grease is not applied to the outer rotating body, the rust inhibitor is spread to the end portion of the outer rotating body in the rotation axis direction, and the generation of rust in the portion can be suppressed. Therefore, the bearing function can be maintained for a long period of time while suppressing a decrease in production efficiency.

In the pulley structure according to a seventh aspect of the present invention, in the sixth aspect, the sliding bearing is formed of a resin composition containing polytetramethylene adipamide as a base resin, and the resin composition contains a reinforcing material containing aramid fibers.

According to this aspect, since wear resistance and strength of the sliding bearing can be increased in a relatively high temperature range, the bearing function can be maintained for a longer period of time.

In the pulley structure according to an eighth aspect of the present invention, in the first to seventh aspects, the accessory machine is an alternator that generates electricity by the rotation of a drive shaft.

When the pulley structure is connected to the alternator and rotates, large heat is generated with power generation due to driving of the alternator, and is transmitted to the pulley structure. Therefore, the temperature of the grease can be sufficiently raised.

The method for manufacturing a pulley structure according to a ninth aspect of the present invention is a method for manufacturing a pulley structure to be connected to an accessory machine of an engine and to which power of the engine is to be transmitted via a belt, in which the pulley structure includes: a cylindrical outer rotating body around which the belt is to be wound; an inner rotating body provided radially inward on the outer rotating body and relatively rotatable with respect to the outer rotating body; and a torsion coil spring disposed in a spring accommodation space formed between the outer rotating body and the inner rotating body, and in which the method includes: applying a grease containing a rust inhibitor to a facing surface of the inner rotating body, facing an inner circumferential surface of the torsion coil spring.

In the manufacturing method of the present invention, since the grease is applied to the facing surface of the inner rotating body, the contact area between the grease and the inner rotating body becomes larger as compared to the case where the grease is simply put into the spring accommodation space in a lump state. Therefore, heat of the inner rotating body is likely to be transferred to the grease during the operation test of the accessory machine and the like. In addition, since the grease is applied to the facing surface of the inner rotating body disposed radially inward among the surfaces forming the spring accommodation space, the grease is likely to spread over the inner rotating body, and the centrifugal force due to the rotation of the inner rotating body acts on the grease, so that the grease is also likely to be diffused to the outer side in the radial direction.

The method for manufacturing a pulley structure according to a tenth aspect of the present invention, in the ninth aspect, includes: after applying of the grease, connecting the pulley structure to the accessory machine, and transmitting a power of a drive source to the pulley structure via the belt to operate the pulley structure.

In this aspect, after applying of the grease, the pulley structure is actually connected to the accessory machine, and the power of the drive source is transmitted to the pulley structure via the belt to operate the pulley structure. As a result, the grease can be diffused to the surfaces forming the spring accommodation space due to the temperature rise of the spring accommodation space with the rotation operation of the pulley structure, the centrifugal force acting on the grease by the rotation of the inner rotating body, and the like.

The method for manufacturing the pulley structure according to the eleventh aspect of the present invention, includes, in the ninth or tenth aspect, mounting the torsion coil spring on the inner rotating body, then, inserting a nozzle of discharging the grease into a gap in the radial direction between the torsion coil spring and the inner rotating body from one side in a rotation axis direction of the inner rotating body, and applying the grease to the facing surface.

When the grease is applied to the inner rotating body before the torsion coil spring is mounted on the inner rotating body, a part of the grease adheres to the torsion coil spring at the time when the torsion coil spring is mounted, and heat of the inner rotating body may be less likely to be transmitted. In this aspect, after the torsion coil spring is mounted on the inner rotating body, the nozzle is inserted into the gap between the torsion coil spring and the inner rotating body and the grease is applied to the facing surface. Accordingly, it is possible to prevent the grease from adhering to the torsion coil spring.

In the method for manufacturing a pulley structure according to a twelfth aspect of the present invention, in the eleventh aspect, the grease is discharged from a discharge port while moving the nozzle from the other side to the one side in the rotation axis direction.

In this aspect, since the grease is applied to the facing surface while the nozzle is simply drawn out from the other side to the one side, that is, toward the side where the nozzle is inserted, in the rotation axis direction, the grease can be easily applied.

In the method for manufacturing a pulley structure according to a thirteenth aspect of the present invention, in any one of the ninth to twelfth aspects, the grease is applied only to the facing surface of the inner rotating body among surfaces forming the spring accommodation space.

In this aspect, since the grease is applied only to the facing surface of the inner rotating body among the surfaces forming the spring accommodation space, it is possible to efficiently diffuse the grease by the rotation of the inner rotating body while reducing the labor as compared to the case where the grease is also applied to other places.

BRIEF DESCRIPTION OF DRAWINGS (a) and (b) of FIG. 1 are a front view and a side view of a belt power-transmission mechanism including a pulley structure.

FIG. 2 is a cross-sectional view illustrating a finished product of the pulley structure.

FIG. 3 is a cross-sectional view taken along the line of FIG. 2.

FIG. 4 is a cross-sectional view taken along the line IV-IV of FIG. 2.

(a) to (g) of FIG. 5 are views illustrating manufacturing steps of the pulley structure.

FIG. 6 is a side view of an inner rotating body.

FIG. 7 is a cross-sectional view illustrating the pulley structure in a state in which it is not yet operated once.

(a) and (b) of FIG. 8 are a front view and a side view of a test machine.

(a) to (d) of FIG. 9 are explanatory views illustrating retention positions of grease before the engine initiation test in the specimens of Examples and Comparative Examples.

FIG. 10 is a view illustrating a confirmation position of the presence or absence of rust inhibitor after the engine start test.

DESCRIPTION OF EMBODIMENTS

Next, an embodiment of the present invention will be described with reference to FIG. 1 to FIG. 10.

(Outline Configuration of Belt Power-Transmission Mechanism)

First, an example of a belt power-transmission mechanism in which a pulley structure 1 described later is incorporated will be described with reference to FIG. 1. (a) of FIG. 1 is a front view of the belt power-transmission mechanism 100, and (b) of FIG. 1 is a side view thereof. The belt power-transmission mechanism 100 includes, for example: a crank pulley 101 connected to a crankshaft 111 of an engine 110 of an automobile or the like; a pulley structure 1 connected to a drive shaft 121 of an alternator 120 ("accessory machine" of the present invention); an AC pulley 102 connected to an air conditioner compressor, which is not illustrated; a WP pulley 103 connected to a water pump, which is not illustrated; and a belt B (V-ribbed belt) wound around these pulleys. Each of the pulleys is rotatably supported. An auto-tensioner 104 is provided in the belt span between the crank pulley 101 and the pulley structure 1. The output of the engine 110 is transmitted clockwise from the crank pulley 101 to the pulley structure 1, the WP pulley 103, and the AC pulley 102 via the belt B, and the respective accessory machines are driven.

(Configuration of Pulley Structure)

Next, the configuration of the finished pulley structure 1, that is, the pulley structure 1 at the time of shipment will be described. FIG. 2 is a cross-sectional view of the finished pulley structure 1. FIG. 3 is a cross-sectional view taken along the line in FIG. 2. FIG. 4 is a cross-sectional view taken along the line IV-IV in FIG. 2. For convenience of description, a left-right direction in the drawing of FIG. 2 is referred to as a front-rear direction ("rotation axis direction" of the present invention), the left side of the drawing, which is tip end side of the pulley structure 1, is referred to as the front ("the other" of the present invention), and the right side of the drawing, which is the base end side of the pulley structure 1, is referred to as the rear ("one" of the present invention). The direction in which the pulley structure 1 rotates is defined as a circumferential direction. The radial direction of the outer rotating body 2 to be described later is defined as a radial direction.

The pulley structure 1 is mainly connected to the alternator 120 that generates AC electricity by the rotation of the drive shaft 121. As illustrated in FIG. 2, the pulley structure 1 includes: an outer rotating body 2 around which the belt B is to be wound; an inner rotating body 3 provided inside the outer rotating body 2 and connected to the driving shaft 121 of the alternator; a torsion coil spring 4 (hereinafter, simply referred to as "spring 4") disposed between the outer rotating body 2 and the inner rotating body 3; and the like.

The outer rotating body 2 is a substantially cylindrical member in which a through hole penetrating in the front-rear direction is formed, and is, for example, a metal member made of carbon steel material such as S45C and the like. As illustrated in FIG. 2, the belt B is wound around the outer circumferential surface of the outer rotating body 2. The outer rotating body 2 is configured to rotate around a rotation axis R by applying torque via the belt B. On an inner circumference of a rear end portion of the outer rotating body 2, a pressure contact surface 21 with which an outer circumferential surface 41 of a rear end portion of a spring 4 to be described later comes into contact is formed. An abutting surface 22 that abuts the spring 4 when it deforms to expand the diameter is formed in front of the pressure contact surface 21. The abutting surface 22 is formed radially outward of the pressure contact surface 21. A portion between the pressure contact surface 21 and the abutting surface 22 is chamfered. A bearing-interposing surface 23 in which a sliding bearing 7 to be described later is interposed is formed in front of the abutting surface 22. The bearing-interposing surface 23 is formed radially outward of the abutting surface 22. A portion between the abutting surface 22 and the bearing-interposing surface 23 is chamfered. An end cap 5 for covering an opening portion in the front of the outer rotating body 2 is attached to a front end portion of the outer rotating body 2.

A rust-proof coating (e.g., cationic electrodeposition coating) is applied to the outer circumferential surface of the outer rotating body 2, both end surfaces in the axial direction, and the chamfered portions. On the other hand, in order to maximize various functions of the pulley structure 1, no coating is applied to portions other than the chamfered portions among the inner circumferential surface of the through hole of the outer rotating body 2 (the pressure contact surface 21, the abutting surface 22, the bearing-interposing surface 23, etc.).

In the coating, it is necessary to consider to optimize the dimension (size of the chamfer) of a corner portion 24 and the like, where a coating material is difficult to attach, on the outer circumferential surface of the outer rotating body 2 depending on the coating material or the coating method, to thereby enhance the adhesion of the coating film to the corner portion 24. When the adhesion of the coating film to the corner portion 24 is insufficient and rust is generated in the corner portion 24, the coating film may be peeled off from the corner portion 24 as a starting portion. Alternatively, the rust grows on the interface between the coating film and the base (outer rotating body 2), and the rust liberated from the corroded portion enters the inside of the spring accommodation space 8 to be described later (particularly, a place where the sliding bearing 7 is disposed). For this reason, it is desirable that the corner portion 24 be, for example, an R surface having a radius of curvature of approximately 0.8 mm or more, or a C surface.

The inner rotating body 3 is a metal member having a substantially cylindrical shape, and is, for example, a metal member made of carbon steel material such as S45C and the like. As illustrated in FIG. 2, the inner rotating body 3 is provided radially inward on the outer rotating body 2 and is configured to be relatively rotatable with respect to the outer rotating body 2 around a common rotation axis R with the outer rotating body 2. The above-described coating is not applied to the inner rotating body 3.

The inner rotating body 3 includes: a cylindrical main body 31; an outer cylindrical portion 32 disposed radically outward on the front end portion of the cylindrical main body 31; a connection portion 33 connecting the cylindrical main body 31 and the outer cylindrical portion 32; and the like. The cylindrical main body 31 is connected to the drive shaft 121 of the alternator. A press-fit surface 38 for press-fitting a rolling bearing 6 to be described later is formed at a rear end portion of the cylindrical main body 31. A facing surface 34 facing an inner circumferential surface 42 of the spring 4 to be described later is formed in front of the press-fit surface 38. The facing surface 34 is formed radially outward on the press-fit surface 38. A contact surface 35 that comes into contact with the inner circumferential surface of the spring 4 is formed in front of the facing surface 34. The contact surface 35 is formed radially outward on the facing surface 34.

The outer cylindrical portion 32 is a cylindrical portion disposed radially outward on the front end portion of the cylindrical main body 31. The outer cylindrical portion 32 extends rearward to the extent not to interfere with the outer rotating body 2. An inner diameter of the outer cylindrical portion 32 is larger than a diameter of the pressure contact surface 21 of the outer rotating body 2. The connection portion 33 is formed radially outward on the front end portion of the cylindrical main body 31 and is an annular portion connecting the cylindrical main body 31 and the outer cylindrical portion 32.

An end surface 36 is formed between the cylindrical main body 31 and the outer cylindrical portion 32 at the front end portion of the inner rotating body 3 (see FIG. 3). The end surface 36 faces a front end surface 49 of the spring 4 to be described later in the circumferential direction. A projection 37 projecting radially inward on the outer cylindrical portion 32 is formed on the inner circumferential surface of the outer cylindrical portion 32 (see FIG. 3). The projection 37 is formed in the vicinity of a position approximately 90° apart from the end surface 36 in the circumferential direction.

A rolling bearing 6 is interposed between the inner circumferential surface of the rear end portion of the outer rotating body 2 and an outer circumferential surface of the rear end portion of the cylindrical main body 31 of the inner rotating body 3. A sliding bearing 7 is interposed between the inner circumferential surface of the front end portion of the outer rotating body 2 and the outer circumferential surface of the outer cylindrical portion 32 of the inner rotating body 3. The outer rotating body 2 and the inner rotating body 3 are relatively rotatable by the rolling bearing 6 and the sliding bearing 7.

The rolling bearing 6 is, for example, a contact seal type hermetic ball bearing. The sliding bearing 7 is, for example, a C-shaped member having elasticity and formed of a resin composition containing a resin of polytetramethylene adipamide (nylon 46) as a base resin (main component). In addition, the resin composition may contain a fibrous reinforcing material having aramid fibers. As a result, wear resistance and strength of the sliding bearing 7 are increased at a relatively high temperature range (e.g., 90° C. to 130° C.), and the bearing function is maintained for a longer period of time. The sliding bearing 7 is mounted on the outer cylindrical portion 32 of the inner rotating body 3 in a state where the diameter thereof is made slightly expand, and is in close contact with the outer cylindrical portion 32 by a self-elastic-restoring force. A gap of approximately 0.1 mm in the radial direction is formed between the sliding bearing 7 and the bearing-interposing surface 23 of the outer rotating body 2. The gap allows air to pass therethrough.

A spring accommodation space 8 for accommodating the spring 4 is formed between the outer rotating body 2 and the inner rotating body 3. Specifically, the spring accommodation space 8 is a space defined by the inner circumferential surface of the outer rotating body 2, the inner circumferential surface of the outer cylindrical portion 32 of the inner rotating body 3, the outer circumferential surface of the cylindrical main body 31, the rear surface of the connection portion 33, and the front surface of the rolling bearing 6.

Since air can flow into from the gap between the outer rotating body 2 and the sliding bearing 7, rust may be generated in portions of the outer rotating body 2 and the inner rotating body 3 where the coating is not performed. Due to the rust, portions of the outer rotating body 2 and the inner rotating body 3, which frequently come into contact with the spring 4 (e.g., the pressure contact surface 21, the abutting surface 22, etc.), the sliding bearing 7 and the like are worn, and the life of the pulley structure 1 may be shortened. Therefore, a grease containing a rust inhibitor is sealed in the spring accommodation space 8 of the pulley structure 1.

The grease is pasty at normal temperature and contains a base oil which is a rust inhibitor and a thickener that increases the consistency (hardness) of the base oil. The base oil is, for example, an ester oil (synthetic oil). As the thickener, for example, use can be made of a urea compound having excellent heat resistance. In order to sufficiently exert the lubrication state while maintaining the condition of the grease, the grease has a consistency comparable to JIS classification No. 2 to No. 3 at 25° C. (the test method is in accordance with JIS K 2220: 2103). The content of the thickener is preferably 5 to 40 mass % based on the total amount of the grease. The grease preferably has a kinematic viscosity of approximately 100 mm$^2$/s at 40° C. (the test method is in accordance with ASTM D 7042-14: 2014). The grease preferably has a specific gravity of approximately 0.97. Although not illustrated in FIG. 2, the grease is diffused over the entire surfaces forming the spring accommodation space 8. The grease is also sealed inside the rolling bearing 6.

Here, the grease is applied to the facing surface 34 of the inner rotating body 3 in a state in which the pulley structure 1 is not yet operated once such that the grease is likely to be diffused over the entire surfaces of the outer rotating body 2 and the inner rotating body 3, forming the spring accommodation space 8. Details will be described later.

The spring 4 is a torsion coil spring formed by spirally winding a spring wire. As the spring wire material of the spring 4, for example, an oil-tempered wire for a spring (in accordance with JIS G 3560: 1994) can be used. The spring 4 is wound leftward (counterclockwise from the front end toward the rear end). The spring 4 has a substantially constant diameter over the entire length in a state in which the outer rotating body 2 and the inner rotating body 3 are not rotating. The spring 4 is interposed between the rear surface of the connection portion 33 of the inner rotating body 3 and the front surface of the rolling bearing, and thus, is accommodated in the spring accommodation space 8 in a state slightly compressed in the axial direction. The spring wire of the spring 4 has a rectangular cross-sectional shape, for example. An outer circumferential surface 41 and an inner circumferential surface 42 of the spring 4 are substantially parallel to the rotation axis R of the outer rotating body 2. In a state where the outer rotating body 2 and the inner rotating body 3 are not rotating, the spring 4 has: a rear end side region 43 in which the outer circumferential surface 41 comes into contact with the pressure contact surface 21 of the outer rotating body 2, in a rear end portion; and a front end side region 44 in which the inner circumferential surface 42 comes into contact with the contact surface 35 of the inner rotating body 3, in a front end portion.

The rear end side region 43 is a region of one round or more (360° or more around the rotation axis) from the rear end of the spring 4. In a state where the outer rotating body 2 and the inner rotating body 3 are not rotating, the rear end side region 43 is accommodated in the spring accommodation space 8 in a state where its diameter is slightly reduced. The outer circumferential surface 41 of the rear end side region 43 is pressed against the pressure contact surface 21 by the self-elastic-restoring force in the radial direction of the spring 4 (see FIG. 2 and FIG. 4).

The front end side region 44 is a region of one round or more (360° or more around the rotation axis) from the front end of the spring 4. In a state where the outer rotating body 2 and the inner rotating body 3 are not rotating, the front end side region 44 is accommodated in the spring accommodation space 8 in a state where the diameter thereof slightly expands. The inner circumferential surface 42 of the front end side region 44 is pressed against the contact surface 35 (see FIG. 2 and FIG. 3). In addition, the front end side region 44 is composed of three portions. That is, as illustrated in FIG. 3, the front end side region 44 includes: a first portion 46 on the front end side (the same direction as the arrow in FIG. 3) of the spring 4 with respect to the projection 37 of the inner rotating body 3 in the circumferential direction; a second portion 47 facing to the projection 37 in the radial direction; and a third portion 48 on the rear end side (the direction opposite to the arrow in FIG. 3) of the second portion 47. In FIG. 3, the portion of the spring 4 sandwiched by the two-dot chain lines is the second portion 47. A front end surface 49 that faces the end surface 36 of the inner rotating body 3 in the circumferential direction is formed at the front end portion of the first portion 46.

(Behavior of Pulley Structure)

Next, the behavior of the pulley structure 1 will be described. First, the case where the rotational speed of the outer rotating body 2 becomes higher than the rotational speed of the inner rotating body 3 (i.e., the case where the outer rotating body 2 accelerates) will be described. The arrow directions in FIG. 3 and FIG. 4 are defined as a forward direction.

First, the outer rotating body 2 starts rotating relatively with respect to the inner rotating body 3 in the forward direction. Here, since the outer circumferential surface 41 of the rear end side region 43 of the spring 4 is pressed against the pressure contact surface 21 of the outer rotating body 2 (see FIG. 4), with the relative rotation of the outer rotating body 2, the rear end side region 43 of the spring 4 moves together with the pressure contact surface 21 towards the forward direction and rotates in the forward direction relatively with respect to the inner rotating body 3. Accordingly, the spring 4 undergoes a torsional deformation in the diameter expansion direction (hereinafter, simply referred to as diameter expansion deformation). The pressure contact force of the rear end side region 43 of the spring 4 against the pressure contact surface 21 increases as the torsional angle of the spring 4 in the diameter expansion direction increases.

When the torsional angle of the spring 4 in the diameter expansion direction is less than a predetermined angle (e.g., 3°), the largest torsional stress is generated in the second portion 47 of the front end side region 44 of the spring 4, and the second portion 47 is most likely to undergo a diameter expansion deformation. Accordingly, first, the inner circumferential surface 42 of the second portion 47 is separated from the contact surface 35 due to the diameter expansion deformation when the torsional angle of the spring 4 in the diameter expansion direction increases. The outer circumferential surface of the second portion 47 abuts against the projection 37 and the diameter expansion deformation of the second portion 47 is restricted at substantially the same time when the second portion 47 is separated from the contact surface 35 or at the time when the torsional angle of the spring 4 in the diameter expansion direction further increases.

The pressure contact force of the third portion 48 with respect to the contact surface 35 becomes substantially zero at the same time when the second portion 47 abuts against the projection 37, or at the time when the torsional angle of the spring 4 in the diameter expansion direction further increases. Furthermore, the third portion 48 is separated from the contact surface 35 due to diameter expansion deformation when the torsional angle further increases. At this time, the diameter expansion deformation of the front end side region 44 of the spring 4 is restricted by the projection 37, and the front end side region 44 is maintained in an arc shape, that is, a shape that is easily slidable with respect to the projection 37. Therefore, when the torsional angle further increases and the torsional torque acting on the spring 4 increases, the front end side region 44 slides in the circumferential direction with respect to the projection 37 and the contact surface 35 against the pressure contact force of the second portion 47 against the projection 37 and the pressure contact force of the first portion 46 against the contact surface 35. In addition, as the front end surface 49 of the spring 4 abuts against the end surface 36 to press against the end surface 36, torque can be reliably transmitted between the outer rotating body 2 and the inner rotating body 3.

When the torsional angle of the spring 4 in the diameter expansion direction further increases, a portion between the front end side region 44 and the rear end side region 43 of the spring 4 increases in diameter. When the torsional angle reaches, for example, approximately 45°, a part of the outer circumferential surface 41 of the diameter-expanded spring 4 abuts against the abutting surface 22 of the outer rotating body 2, and the diameter expansion of the spring 4 is completely restricted, and the outer rotating body 2 and the inner rotating body 3 rotate integrally.

Next, the case where the rotational speed of the outer rotating body 2 is smaller than the rotational speed of the inner rotating body 3 (i.e., when the outer rotating body 2 decelerates) will be described. In this case, the outer rotating body 2 rotates in the opposite direction (opposite to the direction of the arrows in FIG. 3 and FIG. 4) relatively with respect to the inner rotating body 3. With the relative rotation of the outer rotating body 2, the rear end side region 43 of the spring 4 moves together with the pressure contact surface 21 and rotates relative with respect to the inner rotating body 3. Accordingly, the spring 4 undergoes a torsional deformation in the diameter reduction direction (hereinafter, simply referred to as "diameter reduction deformation").

When the torsional angle of the spring 4 in the diameter reduction direction is smaller than a predetermined angle (e.g., 10°), the pressure contact force of the rear end side region 43 with respect to the pressure contact surface 21 slightly decreases as compared to the case where the torsional angle is zero, but the rear end side region 43 presses against the pressure contact surface 21. Furthermore, the pressure contact force of the front end side region 44 with respect to the contact surface 35 is slightly increased as compared to the case where the torsional angle is zero. When the torsional angle of the spring 4 in the diameter reduction direction further increases, the pressure contact force of the rear end side region 43 with respect to the pressure contact surface 21 becomes substantially zero, and the rear end side region 43 slides in the circumferential direction of the outer rotating body 2 with respect to the pressure contact surface 21. Therefore, no torque is transmitted between the outer rotating body 2 and the inner rotating body 3. In this way, the spring 4 transmits or blocks torque between the outer rotating body 2 and the inner rotating body 3.

(Method for Manufacturing Pulley Structure)

Next, a method for manufacturing the pulley structure 1 will be described with reference to FIG. 5.

First, the spring 4 is press-fitted into the inner rotating body 3 (see (a) of FIG. 5) from the rear (see (b) of FIG. 5). Next, the sliding bearing 7 is mounted on the front end portion of the inner rotating body 3 (see (c) of FIG. 5), and the outer rotating body 2 is mounted on the inner rotating body 3 from the rear (see (d) of FIG. 5).

In this state, grease is applied to the facing surface 34 of the inner rotating body 3. For applying the grease, for example, a dispenser 201 is used. As illustrated in (e) of FIG. 5, the dispenser 201 includes a main body 202 and a nozzle 203 extending from the main body 202, and is configured to be able to apply the grease to an object by measuring the grease and discharging the measured grease from the nozzle 203. The nozzle 203 has a diameter that can be inserted between the facing surface 34 of the inner rotating body 3 and the inner circumferential surface 42 of the spring 4, and a discharge port 204 from which the grease is discharged is formed at its tip end portion. The discharge port 204 is inclined obliquely with respect to the direction in which the nozzle 203 extends.

First, the grease is weighed by using the dispenser 201. The amount of the grease required is the minimum amount necessary for forming an oil film on the entire surfaces of the outer rotating body 2 and the inner rotating body 3 on which the coating is not applied, among the surfaces forming the spring accommodation space 8. For example, in the present embodiment, the amount of the grease is approximately 0.2 g (volume is approximately 0.2 cm$^3$).

Next, as illustrated in (e) of FIG. 5, the nozzle 203 of the dispenser 201 is inserted between the facing surface 34 of the inner rotating body and the inner circumferential surface 42 of the spring 4 from the rear of the inner rotating body 3. Here, the press-fit surface 38 is in the rear of the facing surface 34, but the nozzle 203 can be easily inserted since the diameter of the press-fit surface 38 is smaller than the diameter of the facing surface 34. Next, in order to prevent the inner rotating body 3 from being damaged, the tip end of the nozzle 203 is stopped at a position in the rear (e.g., by 5 mm) of the inclined surface between the facing surface 34 and the contact surface 35. Next, at this stop position as a starting position, the discharge port 204 is made to face to the facing surface 34 of the inner rotating body 3 in the radial direction. Then, while the nozzle 203 is moved from the front side to the rear side and retreated to near the press-fit surface 38, and the grease 200 is extruded substantially uniformly and is applied to the facing surface 34. Accordingly, the grease 200 is in a state of extending long in the front-rear direction (see FIG. 6). The grease 200 is not applied to portions other than the facing surface 34, such as the press-fit surface 38. Next, the inner rotating body is slightly rotated, the nozzle 203 is inserted again, and the grease 200 is discharged while the nozzle 203 is retracted. The above operation is repeated a plurality of times to apply the grease 200 to the facing surface 34.

Next, the rolling bearing 6 is press-fitted between the rear end portion of the outer rotating body 2 and the rear end portion of the inner rotating body 3 (see (f) of FIG. 5). At this time, the assembly of the pulley structure is once completed except for mounting of the end cap 5 and the like. The pulley structure 10 (see (f) of FIG. 5 and FIG. 7) at the time when the assembly is once completed corresponds to a pulley structure of the present invention in a state in which it is not yet operated once. The difference between the pulley structure 1, which is a finished product at the time of shipment, and the pulley structure 10 that is not yet operated once, is whether or not the end cap 5 is mounted, and is whether it is in a state in which the grease is diffused on the surfaces forming the spring accommodation space 8 or in a state in which the grease is applied to the facing surface 34 of the inner rotating body 3.

As illustrated in FIG. 7, the grease 200 is in a state of being applied to the facing surface 34 of the inner rotating body 3 in a state in which the pulley structure 10 is not yet operated once immediately after assembly, that is, in a state in which it is not yet connected to the drive shaft 121 of the alternator 120. In other words, the grease 200 strongly contacts the facing surface 34 as compared to the case where the grease 200 is simply charged into the spring accommodation space 8. Since the grease 200 is applied while moving the nozzle 203 in the front-rear direction as described above, the grease 200 extends long in the front-rear direction and is disposed discontinuously in the circumferential direction. The amount of the grease 200 is a minimum amount necessary for forming an oil film on the entire surfaces on which the coating is not applied among the surfaces of the outer rotating body 2 and the inner rotating body 3 forming the spring accommodation space 8, and is, for example, approximately 0.2 g (volume is approximately 0.2 cm³). The thickness of the grease 200 on the facing surface 34 is preferably 2 mm or less. The thickness of the grease 200 on the facing surface 34 is more preferably approximately 0.8 mm to 1.3 mm. The area of the grease 200 adhering to the facing surface 34 is preferably 4% or more of the area of the facing surface 34. The area of the grease 200 adhering to the facing surface 34 is more preferably approximately 6% to 10% of the area of the facing surface 34. The grease 200 is applied only to the facing surface 34 of the surfaces forming the spring accommodation space 8, and is not applied to the other surfaces.

Next, in a manufacturer and the like of the alternator 120, the pulley structure 10 is connected to the drive shaft 121 of the alternator 120. Next, a completion inspection of the alternator 120 is performed, and at the same time, the grease 200 is diffused into the surfaces of the outer rotating body 2 and the inner rotating body 3 forming the spring accommodation space 8. Specifically, for example, as illustrated in FIG. 8, a tester 100a having a configuration equivalent to that of the belt power-transmission mechanism 100 (see FIG. 1) is used, the belt B is wound around the pulley structure 10 and the other pulleys including the pulley 101a connected to the crankshaft 111a of an engine 110a and the like, and the engine initiation and stop are repeated under the same operating conditions as the engine initiation test described later, to operate the pulley structure 10. The number of times of initiating the engine is, for example, five times. Accordingly, the temperature of the spring accommodation space 8 is raised due to the heat generated with the rotation of the pulley structure 10 and the heat generated by the power generation of the alternator 120. For example, the surface temperature of the facing surface 34 increases to about 40° C. in the completion inspection. The temperature of the spring accommodation space 8 is raised and the shear heat is generated by friction between the grease 200 or between the grease 200 and the facing surface 34 so that the temperature of the grease 200 applied to the facing surface 34 is raised, the viscosity of the grease 200 decreases to facilitate flowing. Since the centrifugal force acts on the grease 200 by the rotation of the inner rotating body 3, the grease 200 is scattered radially outward and is diffused to the pressure contact surface 21 of the outer rotating body 2 and the like. A part of the grease 200 also contacts the spring 4, and is also diffused in the front-rear direction, for example, by flowing along the spring wire. In this way, the grease 200 is diffused into the entire surfaces of the outer rotating body 2 and the inner rotating body 3 forming the spring accommodation space 8. The grease is also diffused into the gap between the sliding bearing 7 and the outer rotating body 2, but hardly leaks forward from the gap.

Finally, the end cap 5 is mounted on the front end portion of the outer rotating body 2. Accordingly, the pulley structure 1 is completed (see (g) of FIG. 5).

EXAMPLE

Next, specific examples of the present invention will be described. The inventors of the present invention conducted tests for verifying the effects of the present invention by using the specimens of the pulley structures of Example 1 and Comparative Examples 1 to 3 shown in Table 1.

TABLE 1

| Specimen (Pulley structure) | State of grease before assembling specimen to engine | | Object portion | The number of times of initiating engine (Times) | | | Evaluation |
|---|---|---|---|---|---|---|---|
| | Retention position | State | | 5 | 20 | 50 | |
| Comparative. Example. 1 | Substantially center of facing surface 34 of inner rotating body 3 in front-rear direction | Pasty/lump state | Bearing-interposing surface 23 Pressure contact surface 21 Abutting surface 22 Facing surface 34 Others | B B A A — | A A A A A | | B |
| Comparative. Example. 2 | Rear end portion of facing surface 34 of inner rotating body 3 | Pasty/lump state | Bearing-interposing surface 23 Pressure contact surface 21 Abutting surface 22 Facing surface 34 Others | B A B A — | B A A A — | A A A A A | B |
| Comparative. Example. 3 | Substantially center of outer circumferential surface 41 of spring 4 in front-rear direction | Pasty/lump state | Bearing-interposing surface 23 Pressure contact surface 21 Abutting surface 22 Facing surface 34 Others | A A A B — | A A A B — | A A A B — | B |
| Example. 1 | Substantially center to rear end portion of facing surface 34 of inner rotating body 3 in front-rear direction | Pasty/state of being applied in flat shape | Bearing-interposing surface 23 Pressure contact surface 21 Abutting surface 22 Facing surface 34 Others | A A A A A | | | A |
| Example. 2 | Substantially center to rear end portion of facing surface 34 of inner rotating body 4 in front-rear direction | Pasty/state of being applied in flat shape | Bearing-interposing surface 23 Pressure contact surface 21 Abutting surface 22 Facing surface 34 Others | A A A A A | | | A |

Example 1

The specimen of the pulley structure in Example 1 is a pulley structure 10d illustrated in (d) of FIG. 9, and is the same as the pulley structure 10 including retention position and state of the grease. The grease 200d is applied to the facing surface 34 of the inner rotating body 3 in a flat shape. The amount of the grease 200d is approximately 0.2 g (volume of approximately 0.2 cm$^3$). The retention position of the grease 200d before assembling the specimen to the alternator is a portion ranging from substantially the center to the rear end portion of the facing surface 34 of the inner rotating body 3 in the front-rear direction. The same applies to Example 2 described later. The thickness of the grease 200d on the facing surface 34 is approximately 1 mm, and the area of the grease 200d adhering to the facing surface 34 is approximately 8% of the area of the facing surface 34.

Example 2

The specimen of the pulley structure in Example 2 is a pulley structure 10e illustrated in (d) of FIG. 9 in which the grease 200e is applied to the facing surface 34 of the inner rotating body 3. The thickness of the grease 200e on the facing surface 34 is 1.8 mm to 2.0 mm, and the area of the grease 200e adhering to the facing surface 34 is approximately 4% of the area of the facing surface 34.

Comparative Example 1

The specimen of the pulley structure in Comparative Example 1 is a pulley structure 10a illustrated in (a) of FIG. 9, and has the same configuration as the pulley structure 10 except for the retention position and the state of the grease. In the spring accommodation space 8, approximately 0.2 g of the grease 200a is put in a lump state. The same applies to Comparative Examples 2 and 3 described later. The retention position of the grease 200a is substantially the center of the facing surface 34 of the inner rotating body 3 in the front-rear direction.

Comparative Example 2

The specimen of the pulley structure in Comparative Example 2 is a pulley structure 10b illustrated in (b) of FIG. 9, and the grease 200b is put into the spring accommodation space 8 in a lump state. The retention position of the grease 200b is a rear end portion of the facing surface 34 of the inner rotating body 3.

Comparative Example 3

The specimen of the pulley structure in Comparative Example 3 is a pulley structure 10c illustrated in (c) of FIG. 9, and the grease 200c is put into the spring accommodation space 8 in a lump state. The retention position of the grease 200c is substantially the center of the outer circumferential surface 41 of the spring 4 in the front-rear direction.

(Engine Initiation Test)

Next, an engine initiation test for verifying the effect of the present invention will be described. The inventors of the present invention conducted an engine initiation test to confirm the adhesion state of the rust inhibitor to the object portions of the outer rotating body 2 and the inner rotating body 3 (portions on which the coating is not applied and the rust inhibitor is necessary) forming the spring accommodation space 8.

First, an outline of the engine initiation test will be described. The specimens of the pulley structure to be evaluated are five types of the pulley structures 10a to 10e described above. The engine initiation test of each specimen was performed at a predetermined number of times of initiating the engine (number of times from the initiating to the stopping), and then each specimen was disassembled to visually confirm the presence or absence of the rust inhibitor adhering to object portions, and the presence or absence of adhesion of the rust inhibitor was evaluated based on the evaluation criteria described later. The specific object portions are the portions shown in Table 1 and FIG. 10, that is, the bearing-interposing surface 23, the pressure contact surface 21 and the abutting surface 22 of the outer rotating body 2, the facing surface 34 of the inner rotating body 3, and other portions. The other portions are portions other than the bearing-interposing surface 23, the pressure contact surface 21, the abutting surface 22, and the facing surface 34 among the surfaces of the outer rotating body 2 and the inner rotating body 3 forming the spring accommodation space 8, and are portions where the coating is not applied.

Next, details of the engine initiation test will be described. For each specimen, an engine initiation test was performed by using an engine bench test machine having the same configuration as that of the belt power-transmission mechanism 100 (see FIG. 1). The ambient temperature was adjusted such that the surface temperature of the facing surface 34 was approximately 40° C. when the number of times of initiating the engine was 5 times so as to be consistent with the surface temperature (approximately 40° C.) of the facing surface 34 of the inner rotating body 3 to be reached in the completion inspection of the alternator corresponds to five times of initiating the engine. The number of times of initiating the engine was set three types (5 times, 20 times, 50 times) of, each specimen was prepared corresponding to each number of times of initiating the engine. The initiating and stopping of the engine are alternately repeated, and the test of the specimen was ended when the number of times of initiating the engine reaches a predetermined number of times. The tensile force of the belt was 1,500 N. One operating time of the engine (time from the initiating to the stopping) was set to 10 seconds. In addition, the ambient temperature was set and adjusted on the assumption of the same temperature as the actual vehicle. Further, the rotational speed of the crankshaft at each time of initiating the engine varies between 0 and 1,800 rpm. The maximum rotational speed of the drive shaft of the alternator and the inner rotating body 3 at this time reaches approximately 4,000 rpm. By the above test, the temperature of the spring accommodation space 8 is raised, the temperature of the grease is raised, and the viscosity is decreased. Further, since the centrifugal force acts on the grease by the rotation of the pulley structures 10a to 10e, the grease is diffused on the surfaces of the outer rotating body 2 and the inner rotating body 3 forming the spring accommodation space 8.

After completion of the test, the pulley structure was disassembled, and adhesion state of the rust inhibitor was visually confirmed for each object portion. The case where the rust inhibitor was adhered to the entire object portion, was considered as evaluation A (passed). The case where the rust inhibitor was not adhered to at least a part of the object portion, was considered as evaluation B (failed). The evaluation of portions other than the bearing-interposing surface 23, the pressure contact surface 21, the abutting surface 22, and the facing surface 34 was performed only when the evaluations of these four portions were all A. Further, in each Example or Comparative Example, when the evaluation of all the portions was A, the test was ended.

The test results were as shown in Table 1. In Examples 1 and 2 in which the grease 200 was applied to the facing surface 34 of the inner rotating body 3, adhesion of the rust inhibitor was confirmed on all the object portions at the end of five times of initiating the engine. On the other hand, in Comparative Examples 1 to 3 in which the grease was put in a lump state, a place where the rust inhibitor was not adhered was recognized in the object portion. As a particularly significant tendency, in Comparative Examples 1 and 2 in which the lump of the grease is put to the facing surface 34, the rust inhibitor tended to be less likely to reach the bearing-interposing surface 23 at the front end portion of the outer rotating body 2 farther from the facing surface 34. Further, in Comparative Example 3 in which the lump of the grease was put to the outer circumferential surface 41 of the spring 4, even when the initiating and the stopping of the engine were repeated 50 times, the rust inhibitor did not reach the facing surface 34 radially inward on the spring 4. From the above results, it has been found that when the pulley structure is configured as in Examples 1 or 2, the rust inhibitor can be adhered to all the object portions with a small number of times of initiating the engine.

(Other Tests)

A composite environmental cycle test (24 hours per one cycle) in which salt water-spraying (in accordance with JIS K 5600-7-1) and drying was repeated was performed on the pulley structures in Examples 1, 2 and Comparative Example 1. First, an engine initiation test was carried out with 5 times of initiating the engine in new pulley structures having the same configuration as the pulley structures 10 (pulley structures 10d and 10e) in Examples 1 and 2, and then the composite environmental cycle test was performed. As a result, even when the test of 90 cycles (2,160 hours) was performed on the pulley structure, rust was not generated on the surfaces of the outer rotating body 2 and the inner rotating body 3 forming the spring accommodation space 8. On the other hand, the same engine initiation test and composite environmental cycle test were performed on a pulley structure having the same configuration as that of the pulley structure 10a in Comparative Example 1. As a result, an indication of rust generation was observed at 60 cycles (1,440 hours) on the portion (bearing-interposing surface 23 and pressure contact surface 21) to which the rust inhibitor was not adhered in Table 1. In the case where the grease is not sealed in the spring accommodation space 8, an indication of rust generation was observed in the entire uncoated region of the outer rotating body 2 and the inner rotating body 3 facing the spring accommodation space 8 at 60 cycles.

As described above, in a state before the pulley structure 10 is connected to the drive shaft 121 of the alternator, that is, in a state in which it is not yet operated once, the grease 200 is in a state of being applied to the facing surface 34 of the inner rotating body 3. As a result, the contact area with the inner rotating body 3 becomes larger as compared to the case where the grease 200 is simply put into the spring accommodation space 8 in a lump state, so that the heat of the inner rotating body 3 is likely to be transferred to the grease 200 during the engine initiation test, the temperature of the grease 200 is likely to be raised and the viscosity is likely to decrease. Since the grease is applied to the facing surface 34 of the inner rotating body 3 disposed radially inward among the surfaces forming the spring accommodation space 8, the grease is likely to spread over the inner rotating body 3 and the centrifugal force due to the rotation of the inner rotating body 3 acts on the grease 200, so that the grease 200 is also likely to be diffused outward in the radial direction. Therefore, the rust inhibitor can be made to be easily diffused in the entire region facing the spring accommodation space 8.

The thickness of the grease 200 on the facing surface 34 is 2 mm or less. Therefore, the heat of the inner rotating body 3 is likely to be transmitted to the entire grease 200, and the viscosity of the grease 200 can be made to be easily lowered.

The area of the grease 200 adhering to the facing surface 34 is 4% or more of the area of the facing surface 34. That is, since the heat-transfer area of the grease 200 is large, the heat of the inner rotating body 3 is likely to be transferred to the grease 200.

In addition, since the grease 200 extends in the front-rear direction, when the pulley structure 10 rotates, the grease 200 can be made to be easily diffused in the front-rear direction.

The grease 200 is applied only to the facing surface 34 of the inner rotating body 3. Therefore, it is possible to efficiently diffuse the grease 200 into the spring accommodation space 8 by the rotation of the inner rotating body 3 while reducing the labor as compared to the case where the grease 200 is also applied to other places.

Furthermore, since the grease 200 is applied to the facing surface 34 of the inner rotating body 3, the grease 200 is likely to be diffused on the entire surfaces forming the spring accommodation space 8. Therefore, even in the case where the grease is not applied to the outer rotating body 2 of the pulley structure 10, the grease 200 is spread to the front end portion of the outer rotating body 2 in which the sliding bearing 7 is disposed, and the generation of rust in the portion is suppressed, and the bearing function is maintained for a long period of time. Therefore, it is possible to prolong the life of the pulley structure while suppressing a decrease in production efficiency.

The sliding bearing 7 is formed of a resin composition containing polytetramethylene adipamide as a base resin, and the resin composition contains a reinforcing material containing aramid fibers. As a result, since wear resistance and strength of the sliding bearing 7 can be increased even in a relatively high temperature range, the bearing function can be maintained for a longer period of time.

When the pulley structure 10 is connected to the alternator 120 and rotates, large heat is generated with power generation due to driving of the alternator 120, and is transmitted to the pulley structure 10. Therefore, the temperature of the grease 200 can be sufficiently raised.

After applying of the grease 200, the pulley structure 10 is connected to the alternator 120, and the power of the engine 110a is transmitted to the pulley structure 10 via the belt B to operate the pulley structure 10. As a result, the grease can be diffused to the surfaces forming the spring accommodation space 8 due to the temperature rise of the spring accommodation space 8 with the rotation operation of the pulley structure 10, the centrifugal force acting on the grease 200 by the rotation of the inner rotating body 3 and the like.

After the spring 4 is mounted on the inner rotating body 3, the nozzle 203 is inserted into the gap between the torsion coil spring 4 and the inner rotating body 3, and the grease 200 is applied to the facing surface. Accordingly, it is possible to prevent the grease 200 from adhering to the spring 4.

In addition, since the grease 200 is applied to the facing surface 34 while the nozzle 203 is simply drawn out from the front side to the rear side, that is, toward the side where the nozzle 203 is inserted, the grease 200 can be easily applied.

Next, modification examples in which changes are added to the above embodiments will be described. Here, components having the same configurations as those of the above embodiments are denoted by the same reference numerals, and the description thereof will be omitted as appropriate.

(1) In the above embodiment, the grease 200 is discharged while pulling the nozzle 203 rearward, but the present invention is not limited thereto. For example, the grease 200 may be applied in the circumferential direction by discharging the grease 200 while relatively rotating the nozzle 203 and the inner rotating body 3. That is, in the above-described embodiment, the grease 200 extends linearly along the front-rear direction and is discontinuously disposed in the circumferential direction, but the grease 200 may be continuously applied in the circumferential direction, for example. In addition, the grease 200 may be applied to the entire facing surface 34.

(2) In the above embodiment, the grease 200 is applied by the dispenser 201, but the present invention is not limited thereto. For example, the grease may be applied to the facing surface 34 by using a brush, or the like before the spring 4 is mounted to the inner rotating body 3.

(3) The thickness of the grease 200 on the facing surface 34 may not necessarily be 2 mm or less. The area of the grease 200 adhering to the facing surface 34 may not necessarily be 4% or more of the area of the facing surface 34. The grease 200 may not necessarily be applied only to the facing surface 34, and may be applied, for example, to a portion to which the grease 200 is less likely to be diffused, such as the bearing-interposing surface 23.

(4) The sliding bearing 7 may not necessarily be formed of the resin containing polytetramethylene adipamide. For example, it may be formed of a synthetic resin such as polyacetal resin.

(5) The rotation operation of the pulley structure 10 after applying the grease 200 to the facing surface 34 may not necessarily be performed in a state of being connected to an accessory machine such as the alternator 120. For example, the grease 200 may be diffused by operating the pulley structure 10 in a state of being connected to a dedicated inspection device or the like.

(6) The test machine 100a may not necessarily include the engine 110a as a drive source, and for example, a motor and the like may be used as a drive source.

Although the present invention has been described in detail with reference to specific embodiments, it will be apparent to those skilled in the art that various changes and modifications can be made without departing from the spirit and scope of the invention.

The present application is based on Japanese Patent Application No. 2017-066808 filed on Mar. 30, 2017, and Japanese Patent Application No. 2018-034232 filed on Feb. 28, 2018, the entire contents of which are incorporated herein by reference.

REFERENCE SIGN LIST

1 Pulley structure
2 Outer rotating body
3 Inner rotating body
4 Torsion coil spring
7 Sliding bearing
8 Spring accommodation space
10 Pulley structure
34 Facing surface
42 Inner circumferential surface
110 Engine
110a Engine (Drive source)
120 Alternator (Accessory machine)
121 Drive shaft
200 Grease
203 Nozzle
B Belt

The invention claimed is:

1. A pulley structure to be connected to an accessory machine of an engine and to which power of the engine is to be transmitted via a belt, the pulley structure comprising:
   a cylindrical outer rotating body around which the belt is to be wound;
   an inner rotating body provided radially inward on the outer rotating body and relatively rotatable with respect to the outer rotating body; and
   a torsion coil spring disposed in a spring accommodation space formed between the outer rotating body and the inner rotating body,
   wherein at least in a state where the pulley structure is not yet operated once, grease containing a rust inhibitor is applied to a facing surface of the inner rotating body, facing an inner circumferential surface of the torsion coil spring,
   wherein the grease on the facing surface has a thickness of 0.8 mm or more and 2 mm or less.

2. The pulley structure according to claim 1, wherein the grease has an area adhering to the facing surface which is 4% or more of the area of the facing surface.

3. The pulley structure according to claim 1, wherein the grease is applied on the facing surface along a rotation axis direction of the inner rotating body.

4. The pulley structure according to claim 1, wherein the grease is applied only to the facing surface of the inner rotating body among surfaces forming the spring accommodation space.

5. The pulley structure according to claim 1, comprising a sliding bearing interposed between the inner rotating body and an end portion of the outer rotating body in a rotation axis direction.

6. The pulley structure according to claim 5,
   wherein the sliding bearing is formed of a resin composition containing polytetramethylene adipamide as a base resin, and
   the resin composition contains a reinforcing material containing aramid fibers.

7. The pulley structure according to claim 1, wherein the accessory machine is an alternator that generates electricity by rotation of a drive shaft.

* * * * *